Figure 6:
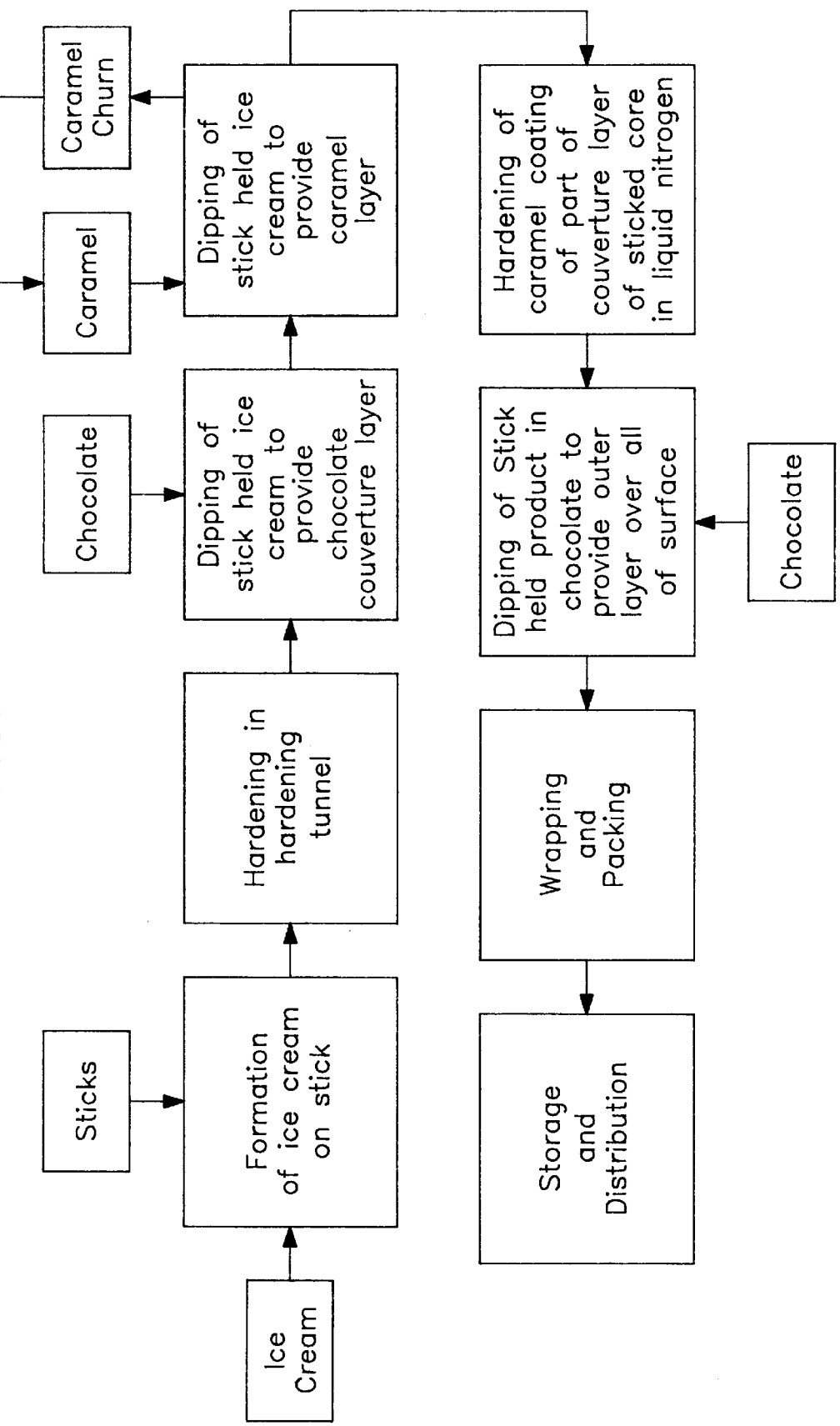

United States Patent [19]
Tucker et al.

[11] Patent Number: 6,099,874
[45] Date of Patent: Aug. 8, 2000

[54] FROZEN NOVELTIES AND THEIR MANUFACTURE

[75] Inventors: John Vincent Tucker; Selma Elizabeth Morcom, both of Auckland, New Zealand

[73] Assignee: Tip Top Investments, Auckland, New Zealand

[21] Appl. No.: 09/008,566

[22] Filed: Jan. 16, 1998

[30] Foreign Application Priority Data

Nov. 28, 1997 [NZ] New Zealand .............................. 329283

[51] Int. Cl.[7] .................................................. A21D 13/00
[52] U.S. Cl. ................................. 426/91; 426/95; 426/99; 426/101; 426/289
[58] Field of Search ................................ 426/101, 95, 91, 426/243, 99, 104, 289

[56] References Cited

U.S. PATENT DOCUMENTS

| | | |
|---|---|---|
| 1,618,324 | 2/1927 | Burt . |
| 1,718,997 | 7/1929 | Burt . |
| 1,769,215 | 7/1930 | Firmin . |
| 2,048,364 | 7/1936 | Willems ...................................... 99/137 |
| 3,061,443 | 10/1962 | McLaughlin .............................. 99/137 |
| 4,189,289 | 2/1980 | Getman ..................................... 425/93 |
| 4,353,927 | 10/1982 | Lovercheck ............................. 426/101 |
| 4,971,816 | 11/1990 | Clark et al. .............................. 426/101 |
| 5,017,390 | 5/1991 | Sawant .................................... 426/100 |
| 5,256,426 | 10/1993 | Tomioka et al. ........................ 426/100 |
| 5,378,483 | 1/1995 | Fazio et al. .............................. 426/101 |
| 5,660,866 | 8/1997 | Tomioka et al. ........................ 426/100 |

FOREIGN PATENT DOCUMENTS

| | | |
|---|---|---|
| 0602147 | 6/1994 | European Pat. Off. . |
| 2263615 | 8/1993 | United Kingdom . |
| WO91/01649 | 2/1991 | WIPO . |
| WO95/21536 | 8/1995 | WIPO . |

OTHER PUBLICATIONS

The Original Champ! Fudge'N Nut Bars, Wells Dairy Inc., (18106), Nov. 1993.

The Champ! Wells Dairy Inc., Premium Vanilla Ice Cream Bar with Creamy Fudge & Spanish Peanuts, (18031), May 1993.

The Champ!Wells Dairy Inc., Premium Vanilla Ice Cream Bar with Creamy Fudge & Spanish Peanuts Dipped in Milk Chocolate.

New Friendly's Caramel Sundae Bar, Wells Dairy Inc., Vanilla Ice Cream, Caramel, Coating made with Milk Chocolate, (26732), Jun. 1993.

New Friendly's Fudge Sundae Bar, Wells Dairy Inc., Vanilla Ice Cream, Fudge, Coating made with Dark Chocolate, (26732), Jun. 1993.

Giants Football Ice Cream Bar, Wells Dairy Inc., Vanilla Ice Cream Bar with Caramel and Almonds.

*Primary Examiner*—Milton Cano
*Assistant Examiner*—Hao Mai
*Attorney, Agent, or Firm*—Jacobson, Price, Holman & Stern, PLLC

[57] ABSTRACT

An edible novelty including an edible core mounted on a stick at one end of the core. The core having another end opposite the one end and the core having an edible coverture layer. A layer of an edible viscous material covering the coverture layer of the core from the other end of the core to, at the most, adjacent the one end of the core. The material being viscous at ambient temperature and remaining substantially unfrozen at a temperature which maintains the core frozen and also at a temperature at which the novelty is eaten. The coverture layer providing an adhesive surface for the edible viscous material. An outer layer over the edible viscous material and at least substantially all of the coverture layer. The outer layer being anchored with respect to the coverture layer.

7 Claims, 6 Drawing Sheets

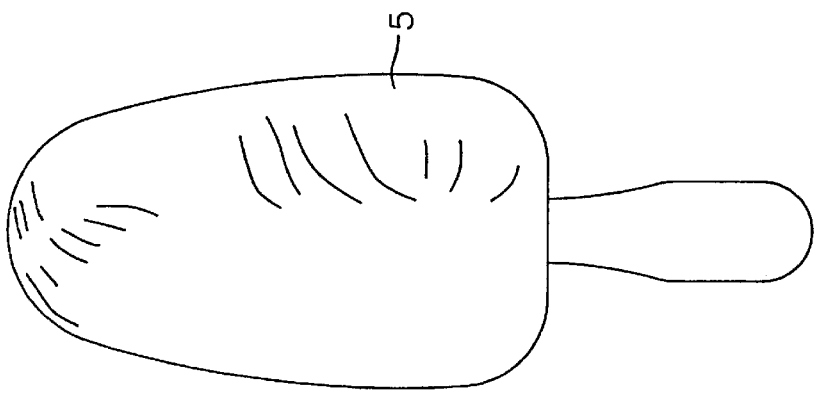
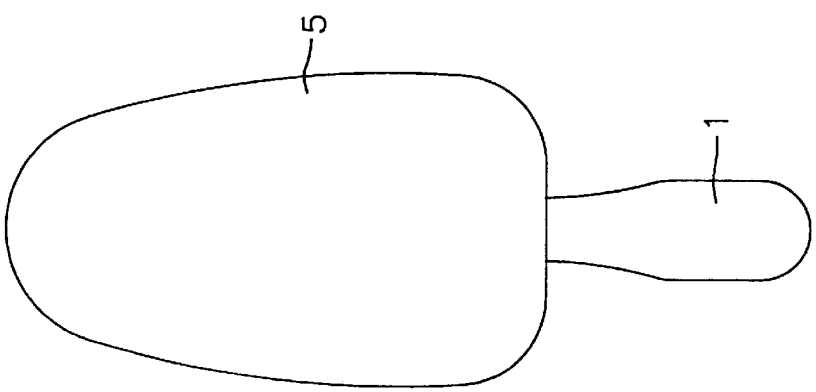
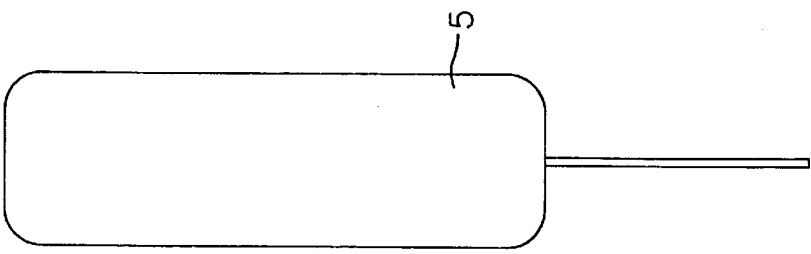
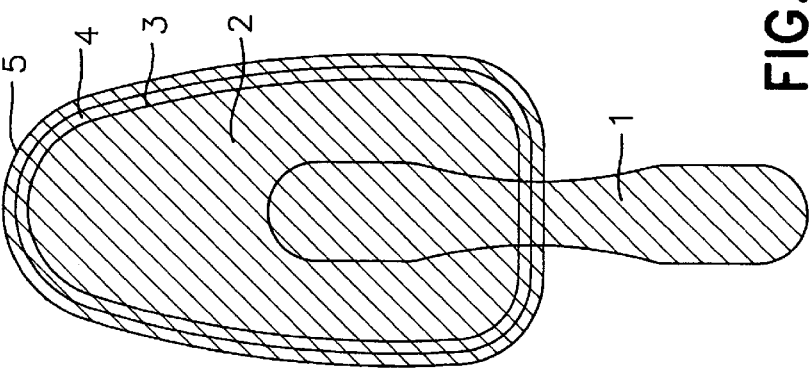
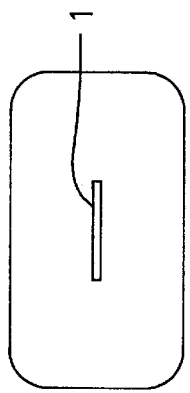

A ⇡ ---  A ⇡ ---

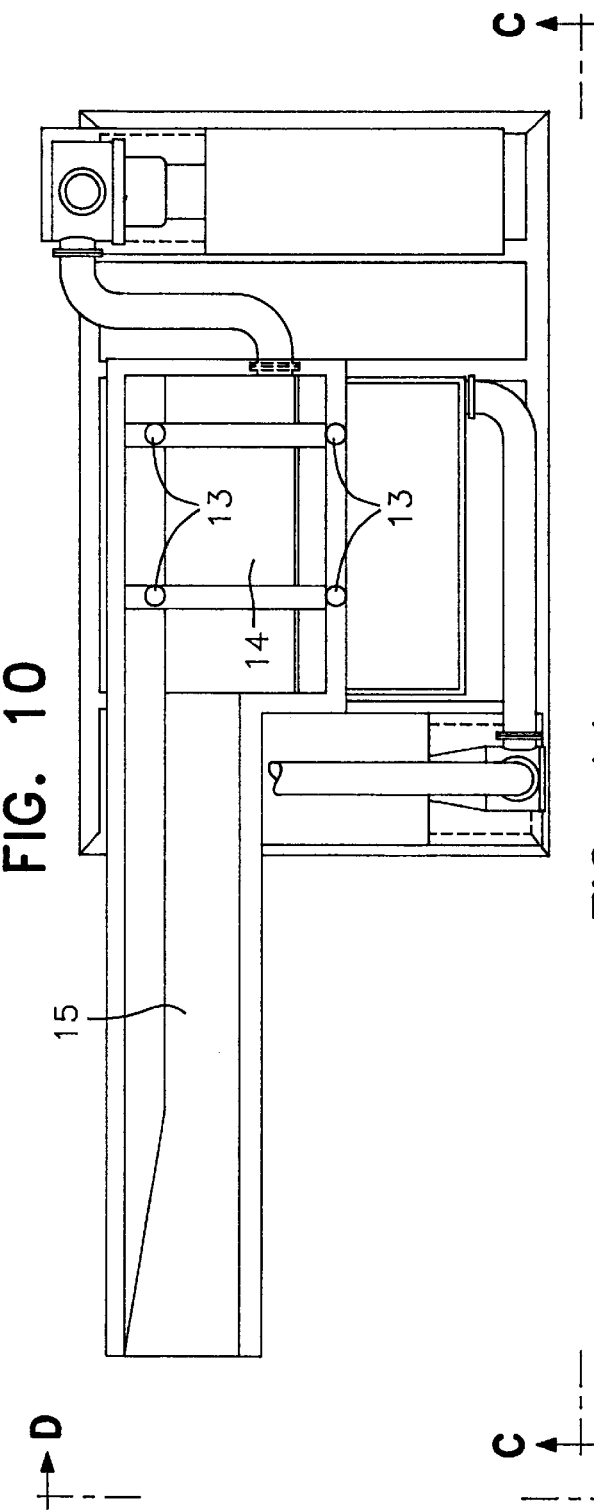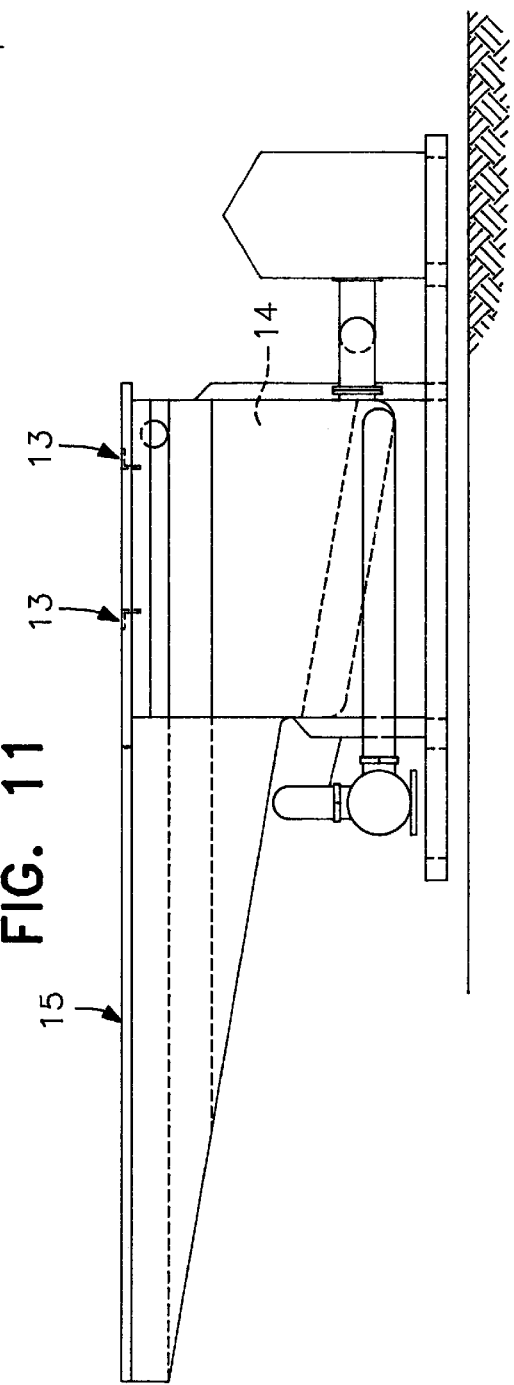

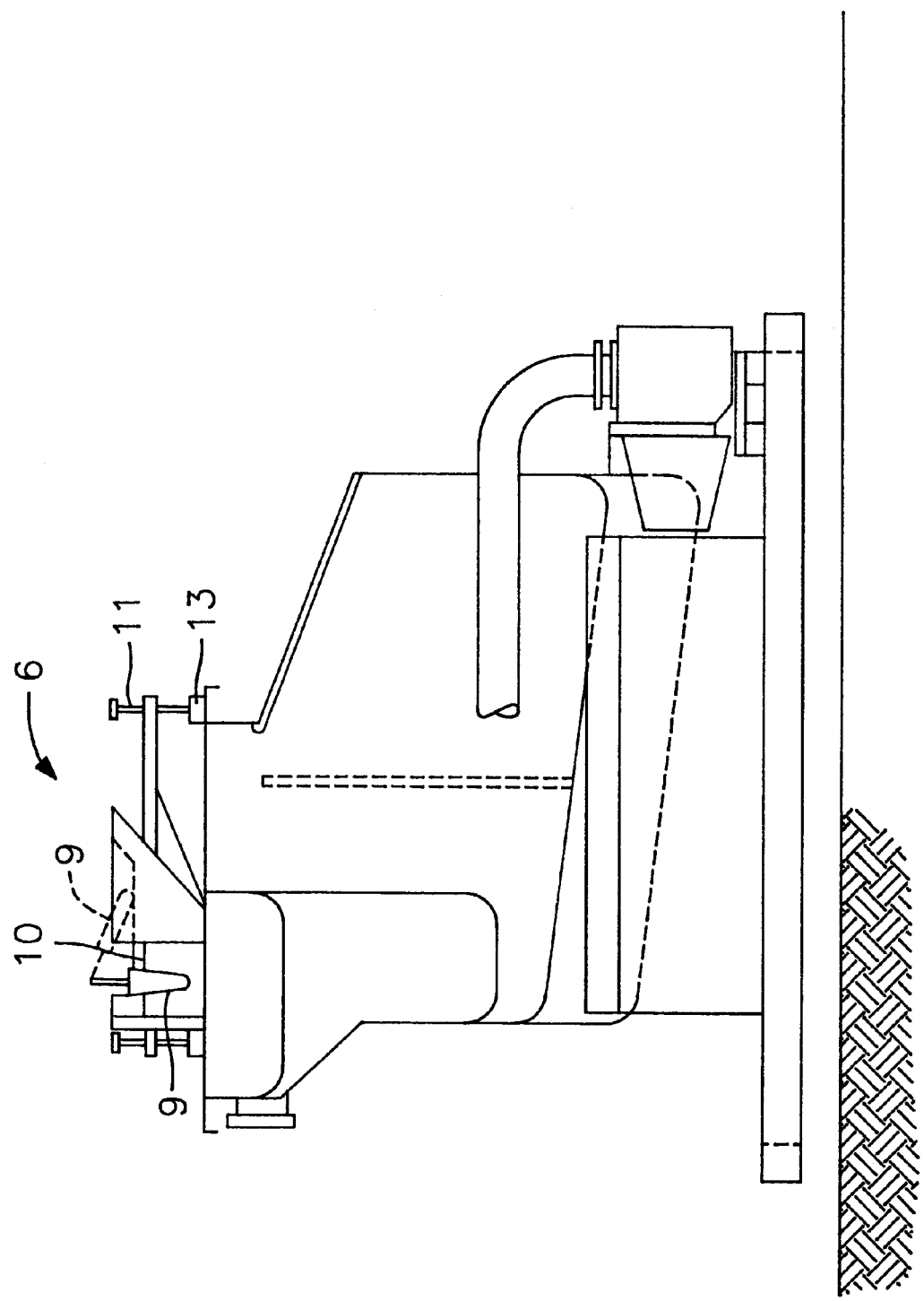

FROZEN NOVELTIES AND THEIR MANUFACTURE

The present invention relates to improvements in an ice cream or the like, novelty, product, methods of manufacture of such a product, apparatus useful in the manufacture of any such product and related means and methods. "Ice Cream" Fourth Edition by W. S. Arbuckle, (The AVI Publishing Company, Inc., Westport, Conn., USA) in its various editions (the full contents of which are hereby introduced by way of reference) defines terminology in relation to the ice cream and related frozen novelty business as well as disclosing compositions, methods of moulding, handling procedures, freezing procedures, storage procedures, etc.

The present invention is directed to an ice cream novelty but alternatively may include in place of ice cream (as defined in Arbuckle) any other frozen matrix or indeed any other material which is edible at the temperatures required for ice cream type products.

The present invention relates to a product which is an alternative to existing products. Whilst preferred forms hereafter will refer to stick or the like supported forms of such a product that is but one option for the use of the procedures of the present invention.

It is therefore an object of the present invention to provide frozen novelties and related means and methods including apparatus for use in such manufacturing as well as the methods of use of such apparatus which will provide the public at least with an alternative to existing products.

As used herein the term "core" can mean either a homogeneous core or a non homogeneous core. It may include preliminary coatings.

As used herein the term "ice cream" includes ice cream as defined in Arbuckle and/or by any New Zealand standards. In addition it includes alternatives to what is strictly ice cream i.e. any edible material that is shape retaining only if maintained in a frozen state by low temperature storage.

As used herein the term "chocolate" includes chocolate in its common usage or as used in Arbuckle or in any New Zealand standard. In addition it includes any other composition which at a higher temperature as a liquid can form a coating on a substrate and thereafter, on reduction of temperature, set. Typical examples of such other materials include fat and sugar based compositions of that kind. "Chocolate" therefore may or may not include cocoa or any other chocolate flavouring.

As used herein the term "stick" includes wooden sticks or any plastic or other form of member capable of supporting a core (e.g. of ice cream) on to which coatings are to be applied by procedures of the present invention. In some forms the term stick may include an edible composition.

As used herein the term "dip" includes insertion of the material to be coated into a bath (stationery or moving) of the liquid composition to form the coating. In other forms however where the context so allows the term "dip" may include any alternative procedures such as spraying.

As used herein the term "viscous fluid" includes caramel compositions of the kind hereinafter referred to as well as any other edible composition which at or about normal ice cream storage temperatures has not set to a super cooled liquid or solid form. Examples include, syrups or syrup like compositions and such compositions as betters of edible nuts etc. (e g. peanut butter).

In a first aspect the present invention consists in an edible novelty that requires storage at below 0° C. and which is intended to be eaten prior to its thawing at least in totality, said product comprising, consisting of or including an edible core that is self supporting as far as its shape is concerned, a coating of an edible viscous liquid about at least part of said core, and a set edible layer over at least said viscous liquid layer.

Preferably said viscous liquid is the thixotropic.

Preferably said set layer over said viscous liquid is chocolate as hereinbefore defined irrespective of whether or not it includes any cocoa or other chocolate flavouring. Preferably said set layer does.

Preferably said core is primarily of ice cream.

Preferably said core includes an outer coating (i.e. a couverture layer) on at least part thereof of a chocolate as hereinbefore defined.

Preferably said core is on a stick.

Preferably the outer layer is of a chocolate.

Preferably said viscous fluid is a caramel liquid which at ice cream storage temperatures remains in a fluid form.

Preferably at normal ice cream storage temperatures the viscous fluid has a viscosity substantially as herein discussed with respect to caramel.

Preferably said product is of a form substantially as hereinafter described with reference to any one or more of the accompanying drawings.

In some other forms the viscous fluid can be another flavouring, for example, a peanut oil or butter composition. Other flavourings abound, They may even be liqueurs where the law so allows.

Preferably where the item (as is preferred) is a stick supported item the core comprises ice cream with a true chocolate coating. Preferably the chocolate coating fully surrounds the ice cream of the core, Preferably caramel extends about the core but not to the stick in the base of the core. Preferably the outer set layer fully encompasses the caramel and the base of the core not covered in caramel.

In this way the product has sufficient integrity so that progressive eating from the top is less likely to lead to any slumpage of any of the layers relative to the others.

In a further aspect the present invention consists in a method of manufacturing an edible novelty to be stored at below 0° C. having, an edible core on a stick, an edible coating of a viscous liquid about at least part of said core, and an edible set layer over at least said viscous liquid layer, which method comprises, consists of or includes preparing the core on a stick, supporting the stick supported core by the stick as it is presented whilst at a core temperature below 0° C. into the viscous liquid so as to provide a partial coating of the core, and thereafter providing an outer coating (e.g. chocolate as hereinbefore defined) coating over the viscous liquid retained on the core and at least part of the or any regions of the core not coated by said viscous liquid.

Preferably said core is provided with a couverture layer, (for example, of chocolate) prior to being associated with said viscous liquid.

Preferably prior to the provision of the outer coating the viscous liquid is hardened, for example, by contact with a cryogenic liquid, e.g. liquid nitrogen.

Preferably the viscous liquid at the time of application to the stick supported core is thixotropic.

Preferably said stick supported core is substantially vertically withdrawn from the bath so as to leave an even laying up of the viscous liquid about the core.

Preferably the bath of viscous liquid is moving in a direction in which the preferably substantially vertically supported stick supported core is also being moved and that direction is preferably substantially transverse to the stick axis (this is notwithstanding the pumping of the liquid or the provision of some fall in the movement of tie liquid).

Preferably the movement of the viscous liquid is at a speed identical to or faster than the transverse movement of the stick supported core.

Preferably the viscous liquid not uplifted by the stick supported core is recycled.

Preferably said method is performed at any of the preferred manufacturing parameters hereinafter described.

In yet a further aspect the present invention consists in apparatus to manufacture an edible novelty as previously defined and/or to perform a method as previously defined, said apparatus comprising, consisting of or including a conveyor to serially present stick supported cores of said edible novelty (preferably after tile provision of a couverture layer (eg; of chocolate) over the ice cream or other stick supported frozen material), a weired dipping reservoir for the viscous liquid in to which the serially presented stick held cores are to be presented and move towards and over the weir whilst supported by the conveyor, a collection reservoir for viscous liquid spilling over the weir, recycling means to return viscous liquid from the collection reservoir to the weired dipping reservoir, and viscous liquid feed in means to provide a make-up flow for the viscous liquid into the collection reservoir, the weired dipping reservoir or any recycle flow between the two.

Preferably means is provided to agitate the viscous liquid prior to its delivery into the weired dipping reservoir whether as a fresh feed of the viscous liquid, the recycled flow thereof or a mixture of the two.

Preferably said means to agitate the thixotropic viscous liquid is a device such as a chum and preferably said device is on the recycle route from the collection reservoir to the weired dipping reservoir.

Preferably any in feed of fresh viscous liquid must pass through such device prior to its initial delivery into the weired dipping reservoir.

Preferably the stick held cores are presented into the viscous liquid of the weired dipping reservoir so as to uplift viscous liquid therefrom whilst primarily in a vertically downward extending condition from the stick notwithstanding the fact that optionally the sticked core may be angled into and/or angled out of the viscous liquid under the action of a cam on the conveyor support of the stick thereof, Preferably the apparatus is as hereinafter described.

In yet a further aspect the present invention consists in, as part of a production line, apparatus substantially as hereinafter described with or without reference to any one or more of the accompanying drawings and/or which includes apparatus as previously defined.

Figure 7:
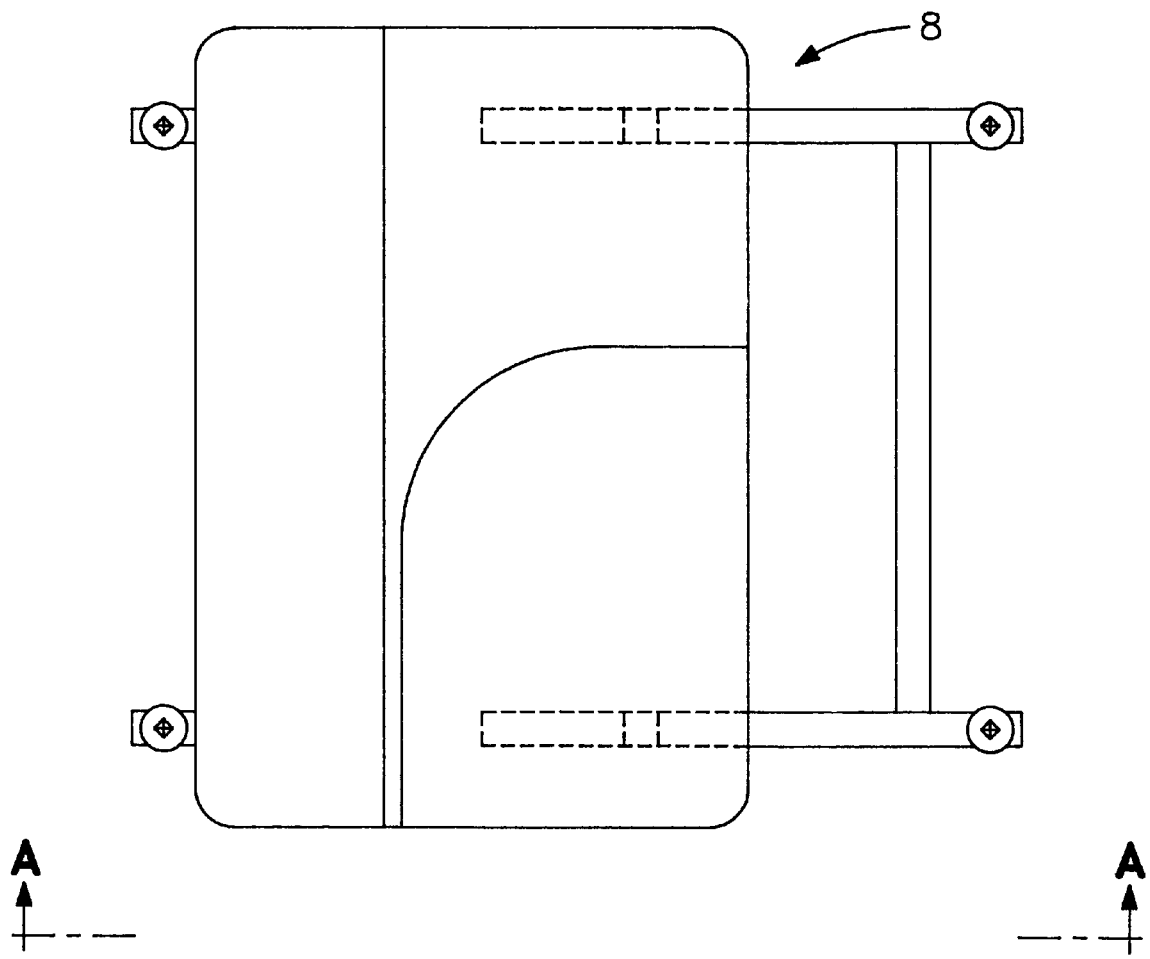
Figure 8:
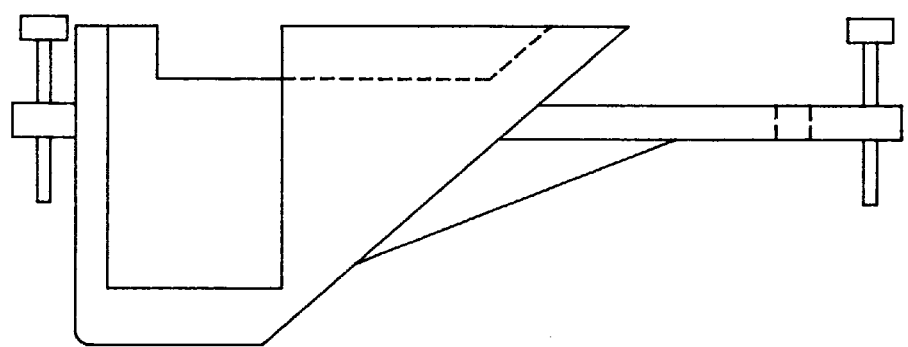
Figure 9:
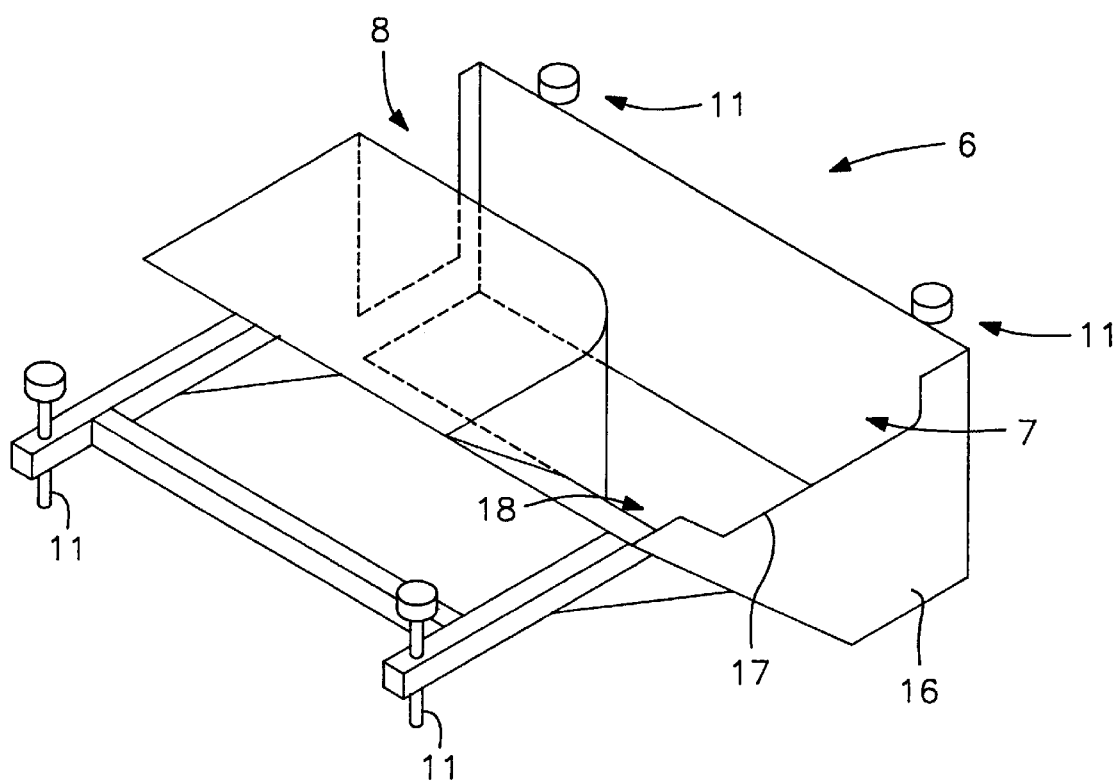

Preferred forms of the present invention will now be described with reference to the accompanying drawings in which FIG. 1 is a cross-sectional side view of a preferred product ("bar") of the present invention showing an ice cream core supported on a stick, a chocolate couverture layer (of approximately 0.5 mm thick), a caramel coating that is not fully surrounding the chocolate couverture layer, (the caramel layer being preferably about 2 mm thick) and an outer chocolate coating (of approximately 2 mm thick), FIG. 2 is a view from below of the product of FIG. 1, FIG. 3 is an end elevation view of the ice cream bar of FIGS. 1 and 2, FIG. 4 is a side view similar to that of FIG. 1 but not in section, FIG. 5 is a perspective view of the bar of FIGS. 1 through 4, FIG. 6 is a preferred flow diagram of the manufacturing process of the edible novelty of the present invention showing (for a product where there is a chocolate couverture layer, a partial dipping in thixotropic caramel and a provision of a full outer layer of chocolate) the in feed stages of the ice cream and sticks, the chocolate for the couverture layer, the caramel (and its association with a churn and a recycle flow of the caramel not being uplifted), and the chocolate for the final coating, the diagram omitting optional additional hardening steps (eg; blast freezer or cryogenic vapour) which for some runs or where hardening has not been down to a sufficiently low temperature may be required, FIG. 7 is a plan view of an assembly to provide the weired dipping chamber the inlet for the serially presented cores being at the top of the drawing and the exit over the weir being at the bottom of the drawing, FIG. 8 is an end view in the direction "AA" with respect to FIG. 7, FIG. 9 is a perspective view of the weired dipping reservoir of FIGS. 7 and 8 from the in feed end, ie; the direction "BB" as shown in FIG. 7, FIG. 10 is a plan view of a collection reservoir with which the weired dipping reservoir of FIGS. 7 through 9 is to be associated, FIG. 11 is a side elevation in the direction "CC" of FIG. 10, and FIG. 12 is an end view from the direction "DD" of FIG. 10 showing associated with the collection reservoir the association thereof of the weired dipping tray, the weired dipping tray being shown as it has been presented in FIG. 8, FIG. 12 additionally showing below a level of the viscous liquid within the weired dipping reservoir a couverture layered sticked core as it would be presented in substantially a vertical form in the flowing bath of viscous liquid (which moves to an over the weired end) and showing how, if desired, the sticked core with its couverture layer can be angled in over the non weired end of the dipping reservoir using a camming arrangement (not shown) on a conventional conveyor support (not shown but refer to Arbuckle) for such stick products.

As can be seen in FIG. 1 the stick 1 is inserted into an extruded ice cream core 2 about which there is subsequently provided a couverture layer 3 of chocolate. Over the upper part (but not fully over the couverture layer 3) is the caramel layer 4 (caramel being a preferred thixotropic viscous liquid in accordance with the present invention). Over all of the partly coated product is an outer chocolate layer 5 which provides integrity by binding to the geometry of the product and providing grip even during consumption notwithstanding the eating down of the product during its consumption.

The apparatus of the present invention performs the method as described in FIG. 6 the details of which will be described in greater detail hereinafter.

The apparatus comprises primarily the apparatus of FIGS. 7 through 9 which is to locate on the viscous liquid collection apparatus of FIGS. 10 and 11 in a manner as depicted (in the end on view) in FIG. 12. There it can be seen the dipping reservoir with its weir supported on the collection reservoir apparatus, The weired dipping apparatus 6 has an entrance end 7 and a weired exit end 8 for the bars (ie; the caramel dipped couvertured sticked cores) as depicted as 9 in FIG. 12. Indeed FIG. 12 shows the conveyor (not shown) supported sticked couverture layered core diagrammatically below a viscous liquid level 10 as it moves towards the weired end 8.

The height adjustment and locating screws 11 of the apparatus 6 is locatable as shown in FIG. 12 on means 13 best seen in FIG. 10. This rapid locatability of the dipping tray is desirable to facilitate cleaning.

As can be seen the correction apparatus includes a main reservoir 14 for caramel in to which caramel drips on the collection region 15 as sticks advance to the left with respect to FIGS. 10 and 11 collect. As shown in the drawings there is provision for caramel within the collection reservoir 13 to be taken away and return if desired to itself so as to maintain the breakage by share of the set of the caramel so as to maintain it in its less viscous condition. This however is not essential.

As far as the dipping tray 6 is concerned the feed of caramel thereto can be either through an end wall 16 (ie; that end wall having the reduced height at 17 to better enable the vertical presentation of the bars into the bath) or over in to the dipping reservoir 7 over the region 18 (see FIG. 9). It is not critical just where the entry is in to the bath provided that there is preferably a flow of the caramel or other edible viscous liquid (preferably thixotropic) towards the weired outlet 8 whilst still maintaining an adequate level for emersion of the bars as they move in the same direction (preferably slight slower than the flow rate of the viscous liquid) towards and out of the weired region 8, The provision of the flow of the viscous liquid during the dipping process is to minimise stress on the bars held on the conveyor as they march and also to minimise drag thereon during the dipping process, Whilst synchrony of speed of movement can be arranged the slight excess speed of the caramel or other viscous liquid is more preferred.

Not shown in the drawings is a churn or other mixer or agitator which takes a feed of the caramel from the reservoirs 18 and breaks down the gel structure before feeding that caramel in to the dipping tank. Fresh caramel can be inserted in to the system at any desired stage provided however it passes through the churn at least once prior to movement in to the dipping reservoir 7. Obviously multiple chums could be provided so that there is separate churning of the in feed caramel although in order to minimise the need for plant it is desirable to churn as it is blended with the recycle flow.

In preferred forms of the present invention there may be not only the recycle flow from the collection reservoir through the churn back into the dipping reservoir and from thence on to a bar or back in to the correction reservoir but also directly back in to the collection. This can be desirable where the chum is the sole source of cooling of the caramel in order to maintain it at ideal temperatures.

Persons skilled in the art will appreciate that the present invention provides novel apparatus and methods whereby the novel edible product of the present invention can be prepared.

In relation to preferred perimeters not hereinafter described reference is made to Arbuckle previously referred to.

Sticked Core

The sticked core is preferably formed using conventional apparatus (see Arbuckle) where an extruded quantity of ice cream cut from the extruder is provided with the stick and is hardened down to below 0° C. temperatures as are conventional in order to provide integrity for downstream purpose and to make more speedy the set of the couverture layer of the chocolate thereon, such a couverture chocolate layer being applied in a known manner (see Arbuckle).

Caramel Viscosity

Before processing (i.e. in pail) ~48,000 cPs In dipping tank (churned, pumped and at −3 degC.) ~10,000 cPs Yield Value (i.e. in pails, 7 days after manufacture ) ~1,000,000 cPs Operating Parameters Caramel is passed through a heat exchanger to provide shear and break down the gel structure, and also to remove heat to reduce the heat load on the nitrogen dipping station (ie; the hardening step shown in FIG. 6) further down the process.

The dipping temperature range is preferably in a caramel temperature range of 0 to −7 degC., optimum −5 degC.

Rheology

The caramel sauce is thixotropic (time dependent shear thinning).

Initial shearing due to pumping and subsequent churning breaks reversible gel structure and reduces viscosity to a level that provides desired coating thickness (eg; 2 mm).

Formulation

The caramel is formulated to provide short texture with high yield value, such that after caramel is applied to bar the excess hanging on the tip of tie bar tends to break off, rather than run or string off.

The coating adheres to the cold bar once dipped and begins to set (due to nature of reversible gel). This minimises flow of caramel along surface of bar and ensures an even coating thickness along the length of the bar.

Sugar content has some sucrose replaced with fructose to minimise expansion on freezing.

Dipping Equipment

Pumps sized such that flowrate through dip tank is greater than speed of travel of bars through dip tank to minimise drag.

Bars exit the dip tank in a vertical position, rather than being lifted out on an angle, to ensure coating remains the same thickness on both sides of the bar. (If bars were lifted out on angle, extra caramel would be 'scooped' up and top side coating would be thicker than underside).

Addition of "fresh caramel" to the system is preferably fed directly to the churn prior to entering the dip tank trough. This prevents gelled clumps of caramel from adhering to the bar causing a lumpy appearance.

Dipping Process

The bars are completely covered in chocolate couverture which provides a complete barrier between the ice cream and subsequent layer of caramel.

The couverture layer is desirable to provide an adhesive surface for the caramel as well as the organoleptic feature of cracking when the consumer bites through the couverture layer.

When being dipped in caramel, the bars are preferably only dipped to the shoulder leaving an exposed area of couverture coating. This means that when the final coating of chocolate is applied it is anchored to the couverture layer as well as overlying the caramel layer. This prevents the outer layer from sliding off the bar as it would if adhered only to the caramel layer.

Hardening of Caramel Layer

After dipping in caramel the bars are hardened by dipping in liquid nitrogen to solidify the caramel coating. The combined churning and dipping in liquid nitrogen ensures the following:

shape and surface appearance is retained by halting further flow of the high solids caramel after dipping, removes a substantial amount of heat (approx 10° C.) resulting in:
  eliminating potential for caramel to slide on the bar;
  expanding caramel sauce prior to coating thereby reducing chocolate stress fractures caused by expansion during −25° C. storage. This ultimately leads to visible cracking;
  speeds drying of the chocolate prior to wrapping.

We claim:

1. An edible novelty comprising:
   an edible core mounted on a stick at one end of said core, said core having another end opposite said one end and said core having an edible coverture layer,
   a layer of an edible viscous material covering said coverture layer of said core from the other end of the core to, at the most, adjacent the one end of said core, said material being viscous at ambient temperature and remaining at least partially unfrozen at a temperature which maintains the core frozen and also at a temperature at which the novelty is eaten,
   said coverture layer providing an adhesive surface for said edible viscous material, and
   an outer layer over said edible viscous material and at least part of the coverture layer, said outer layer being anchored with respect to said coverture layer.

2. The novelty of claim 1, wherein said edible viscous material is thixotropic.

3. The novelty of claim 1, wherein said outer layer over said edible viscous material is chocolate.

4. The novelty of claim 1, wherein said core is ice cream.

5. The novelty of claim 1, wherein said core is ice cream and said coverture layer is chocolate.

6. The novelty of claim 1, wherein said edible viscous material is a caramel which at ice cream storage temperature remains in a fluid form.

7. An edible novelty comprising
   a stick,
   an edible core mounted on the stick at one end of the core, said core having another end opposite said one end,
   an edible coverture layer about said core,
   a layer of an edible viscous layer covering said edible coverture layer of said core from the other end of the core to, at the most, adjacent the one end of said core, said edible viscous layer remaining viscous at the temperature which will maintain the core frozen immediately prior to consumption, said coverture layer providing an adhesive surface for said edible viscous layer, and
   an outer chocolate layer over all of said edible viscous layer and at least part of said coverture layer, said outer chocolate layer being anchored with respect to said coverture layer.

* * * * *